United States Patent [19]

Inoue

[11] Patent Number: 5,557,788
[45] Date of Patent: Sep. 17, 1996

[54] RELATIONAL ACCESS SYSTEM FOR NETWORK TYPE DATA BASES WHICH USES A UNIQUE DECLARATIVE STATEMENT

[75] Inventor: Hiroyumi Inoue, Tokyo, Japan

[73] Assignee: NEC Corporation, Tokyo, Japan

[21] Appl. No.: 218,631

[22] Filed: Mar. 28, 1994

[30] Foreign Application Priority Data

Mar. 27, 1993 [JP] Japan .................................. 5-092414

[51] Int. Cl.⁶ .................................................. G06F 17/30
[52] U.S. Cl. .................... 395/600; 395/650; 364/DIG. 2; 364/963.5; 364/966.8
[58] Field of Search .................................. 395/600, 575, 395/700, 650

[56] References Cited

U.S. PATENT DOCUMENTS

| | | | |
|---|---|---|---|
| 4,631,664 | 12/1986 | Bachman | 395/600 |
| 4,945,475 | 7/1990 | Bruffey et al. | 395/600 |
| 5,201,046 | 4/1993 | Goldberg et al. | 395/600 |
| 5,201,047 | 4/1993 | Maki et al. | 395/600 |
| 5,291,583 | 3/1994 | Bapat | 395/600 |

OTHER PUBLICATIONS

"ACOS-4/XV PADBS General Description, DRB81E-2", NEC Corporation, 1992, pp. 4-1 to 4-37.
"ACOS-4/XVP ADBS Design Guide, DRB85E-2", NEC Corporation, 1992, pp. 6-1 to 6-13.
C. J. Date with Colin J. White; "A Guide to SQL/DS"; Addison-Wesley Publishing company, Inc. pp. 222-231 and 287-297.

Primary Examiner—Thomas G. Black
Assistant Examiner—C. Pham
Attorney, Agent, or Firm—Foley & Lardner

[57] ABSTRACT

Schema deriving module 1 generates a relational schema 6 from a subschema 5, in accordance with a unique declarative statement 4 to the effect that the combination of items of parent-descendant records in a network type data base 10 becomes unique in the network type data base 10. Unique declaration module 11 adds columns corresponding to the items designated in the unique declarative statement 4 to the applicable table definitions in the relational schema 6, and adds the contents of the unique declarative statement 4 as unique definition information. SQL statement translating module 2, when translating an SQL statement 7, according to the unique definition information in the relational schema 6, interprets it as an access to set a table combination, and generates a DML object designating an access route.

8 Claims, 10 Drawing Sheets

RELATIONAL ACCESS SYSTEM FOR NETWORK TYPE DATA BASES WHICH USES A UNIQUE DECLARATIVE STATEMENT

DETAILED DESCRIPTION OF THE INVENTION

The present invention relates to an access system for data bases, and more particularly to a relational access system for network type data bases, permitting access to network type data bases by the structured query language (SQL), which is a data manipulation language for relational data bases.

BACKGROUND OF THE INVENTION

An example of relational access system for network type data bases, enabled to access network type data bases by the SQL, which is a data manipulation language for relational data bases, so that the user can retrieve data on a network type data base as if they were data on a relational data base, is disclosed in "ACOS-4/XVP ADBS GENERAL DESCRIPTION, DRB81E-2, NEC CORPORATION, 1992, pp. 4-1 to 4-37" and "ACOS-4/XVP ADBS DESIGN GUIDE, DRB85E-2, NEC CORPORATION, 1992, pp. 6-1 to 6-13".

Figure 8:
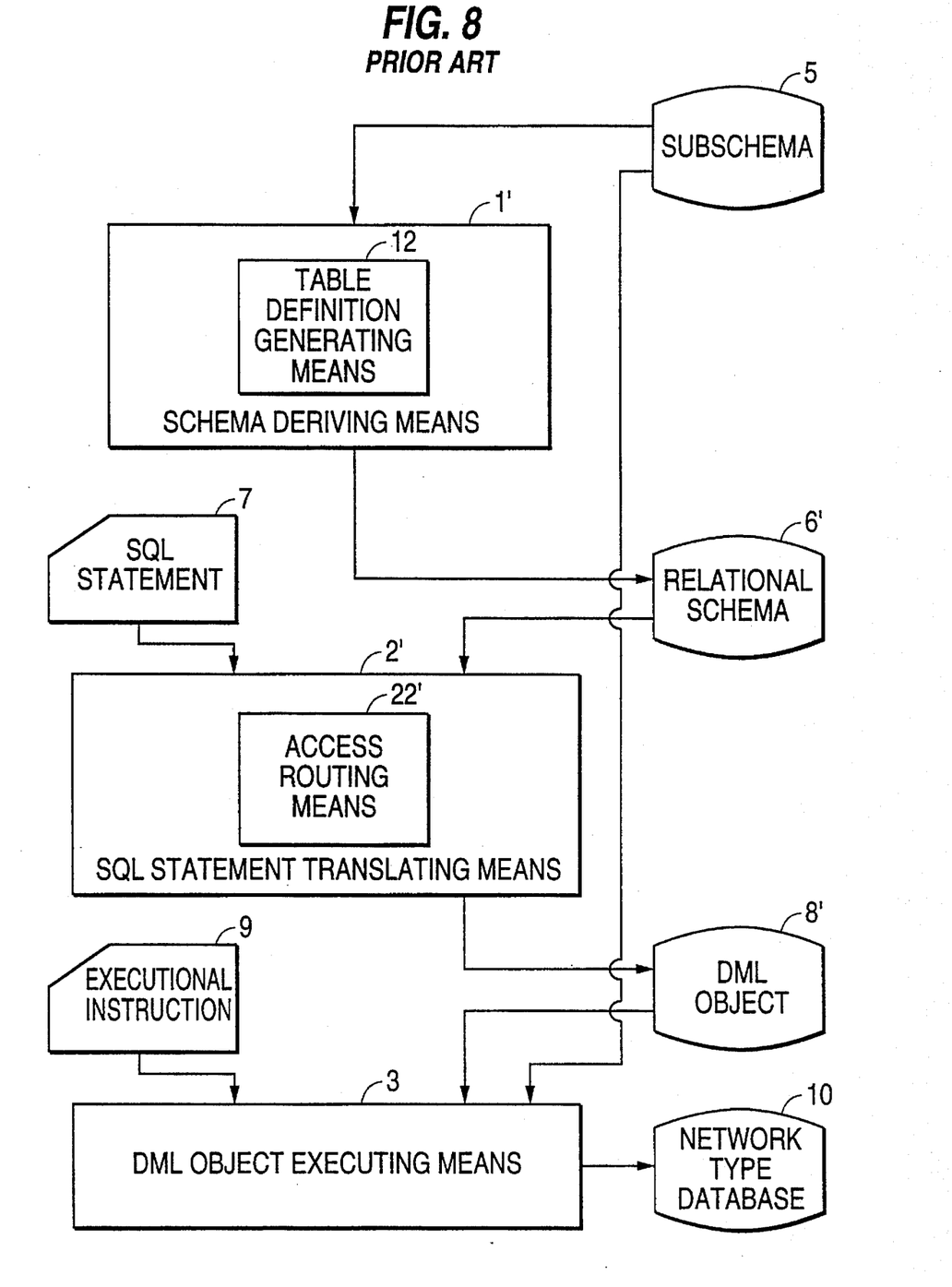
FIG. 8 is a diagram illustrating the configuration of a relational access system for network type data bases according to the prior art.

FIG. 8 is a diagram illustrating the configuration of the prior art relational access system for network type data bases disclosed in these publications.

This conventional relational access system for network type data bases consists of schema deriving means 1', into which a subschema 5 is entered, for supplying a relational schema 6'; SQL statement translating means 2', into which the relational schema 6' and an SQL statement 7 are entered, for supplying a data manipulation language (DML) object 8'; and DML object executing means 3, into which the DML object 8' and an executional instruction 9 are entered, for accessing a network type data base 10.

The subschema 5, consisting of the logical structure of the parts required by individual processing programs, extracted from a schema (not shown) in which information on the logical structure of the whole network type data base 10 is stored, includes among other things record definitions indicating the structures of records stored in the network type data base 10, set definitions representing relationships among the records, and the definitions of key items, which are the items serving as keys to direct accessing of the records.

Figure 9:
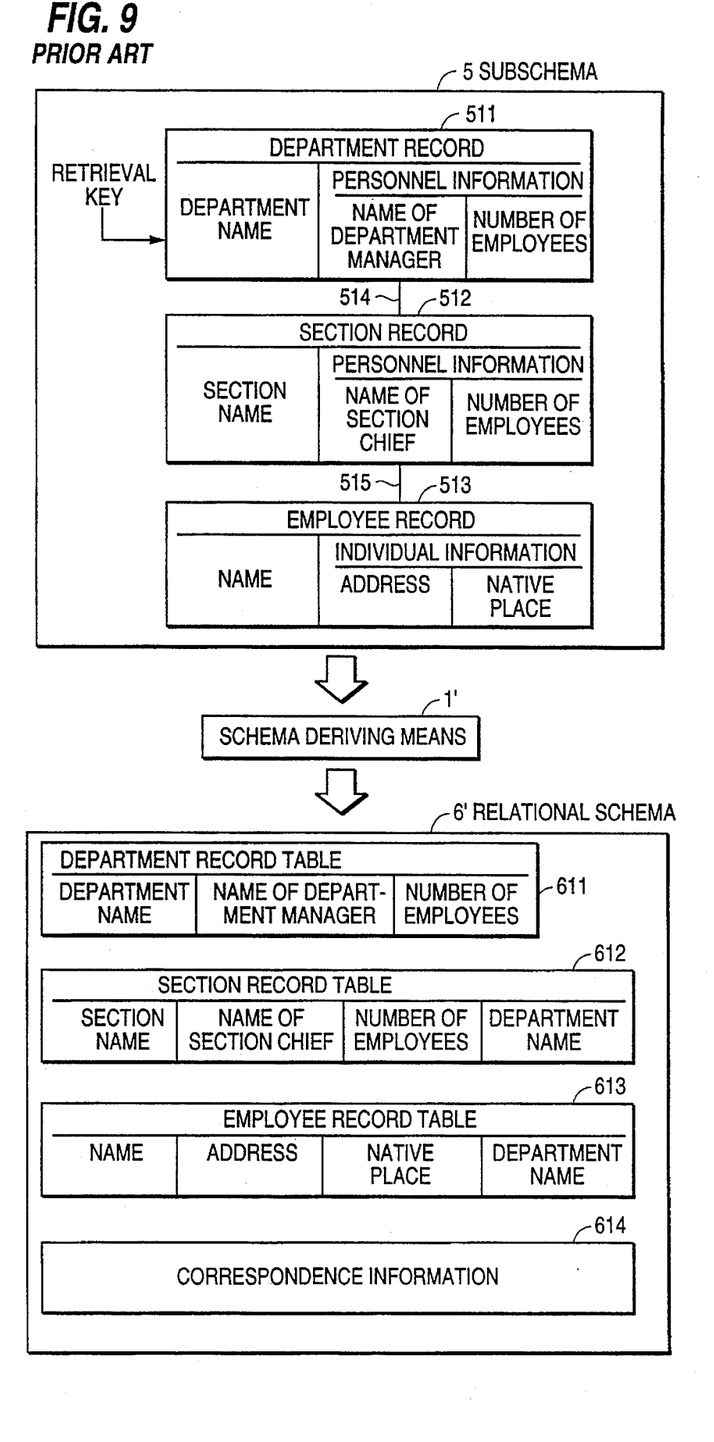
FIG. 9 illustrates an example of subschema and a relational schema according to the prior art, generated from this subschema.
Figure 10:
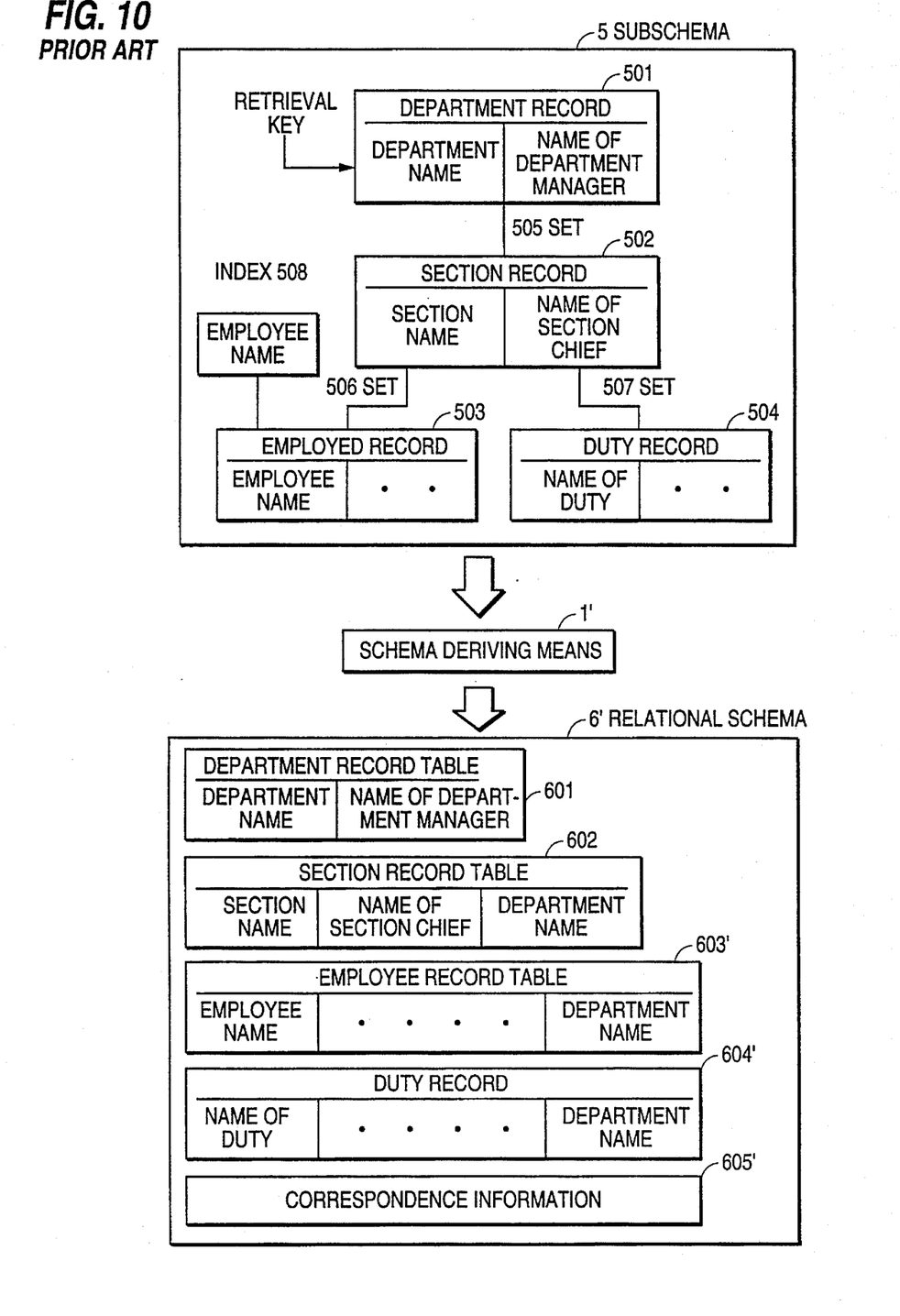
FIG. 10 illustrates another example of subschema and a relational schema according to the prior art, generated from this subschema.

FIGS. 9 and 10 illustrate different simple examples of the subschema 5.

The subschema 5 in FIG. 9 includes a department record 511, a section record 512 and an employee record 513, and the record definitions of the department record 511 and the section record 512 are linked by a set 514, while those of the section record 512 and the employee record 513 are linked by a set 515. The department record 511 has the items of "department name", "name of department manager" and "number of employees", and the department name is defined to be the unique retrieval key for use in directly accessing this record. The section record 512 has the items of "section name", "name of section chief" and "number of employees", and the employee record 513 has the items of "name", "address" and "native place". Neither the section record 512 nor the employee record 513 has a unique retrieval key.

The subschema 5 in FIG. 10 is an example of subschema having a tree structure and including the definitions of a department record 501, a section record 502, an employee record 503 and a duty record 504. The record definitions of the department record 501 and the section record 502 are linked by a set 505, those of the section record 502 and the employee record 503 are linked by a set 506, and those of the section record 502 and the duty record 504 are linked by a set 507. The department record 501 has the items of "department name" and "name of department manager", and the department name is defined to be the unique retrieval key for use in directly accessing this record. The section record 502 has the items of "section name" and "name of section chief". The employee record 503 has the items of "name of employee" and so forth, and to the item of "name of employee" is attached an index 508. The duty record 504 has the items of "name of duty" and so forth.

The schema deriving means 1' in FIG. 8 includes table definition generating means 12, into which the subschema 5 of the contents such as shown in FIGS. 9 and 10 are entered, for generating the relational schema 6'.

The relational schema 6' is derived by converting the subschema 5 into a form permitting relational handling, and is so called to distinguish it from the schema and the subschema in the network type data base.

The schema deriving means 1' generates the relational schema 6' from the subschema 5 in accordance with the following conversion rules.

(1) One relational schema is generated from one subschema in a network type data base.

(2) One table definition is generated for one record definition in the subschema.

(3) The columns constituting each table in the relational schema consist of basic columns and additional columns. The basic columns include all the items existing in the original record. The additional columns include items in all the records which constitute the ancestor records of the original record, satisfying the following requirements.

i) The item constitutes some key in a record definition of the schema.

ii) That key is selected by the subschema.

iii) There is only one item to constitute that key.

(4) Correspondence information indicating the relationships of correspondence between the tables in the relational schema and the records, sets, retrieval keys and indices among other things in the subschema are generated at the same time.

One of the reasons why key items among the items of ancestor records are used as additional columns is that, if all the items including non-key items were also incorporated into the additional columns, the number of columns of table definition would become enormous, inviting massive consumption of resources including the main storage and thereby giving rise to performance problems. Another reason is that more than one column having the same name might emerge in one table, which would be inconsistent with the specifications of SQL.

If the above-stated conversion rules are followed, in the case of the subschema 5 in FIG. 9 for instance, the schema driving means 1' generates the relational schema 6' shown in FIG. 9, which includes a department record table 611 in which only basic columns ("department name", "name of department manager" and "number of employees") are defined, a section record table 612 in which basic columns ("section name", "name of section chief" and "number of employees") and an additional column "department name" are defined, an employee record table 613 in which basic columns ("name", "address" and "native place") and an additional column "department name" are defined, and correspondence information 614. The correspondence information 614 indicates that the department record table 611 corresponds to the department record 511, and its retrieval key is the "department name"; that the section record table 612 corresponds to the section record 512, and its additional column "department name" corresponds to the item "department name" in the department record 511 traced through the set 514; and that the employee record table 613 corresponds to the employee record 513, and its additional column "department name" corresponds to the item "department name" in the department record 511 traced through the set 515, section record 512 and set 514.

In the case of the subschema 5 in FIG. 10, the schema deriving means 1' generates the relational schema 6' shown in FIG. 10, which includes a department record table 601 in which only basic columns ("department name" and "name of department manager") are defined, a section record table 602 in which basic columns ("section name" and "name of section chief") and an additional column "department name" are defined, an employee record table 603' in which basic columns ("employee name", ... ) and an additional column "department name" are defined, a duty record table 604' in which basic columns ("name of duty", ... ) and an additional column "department name" are defined, and correspondence information 605'. The correspondence information 605' indicates that the department record table 601 corresponds to the department record 501, and its retrieval key is the "department name"; that the section record table 602 corresponds to the section record 502, and its additional column "department name" corresponds to the item "department name" in the department record 501 traced through the set 505; that the employee record table 603' corresponds to the employee record 503, and its additional column "department name" corresponds to the item "department name" in the department record 501 traced through the set 506, section record 502 and set 505; and the duty record table 604' corresponds to the duty record 504, and its additional column "department name" corresponds to the item "department name" in the department record 501 traced through the set 507, section record 502 and set 505.

The SQL statement translating means 2' includes access routing means 22'. An SQL statement 7, in which a data manipulating instruction is stated in SQL, which is a data manipulation language for relational data bases, is entered into the SQL statement translating means 2', which determines with the access routing means 22' the access route to realize access to the network type data base 10 requested by the SQL statement 7 by referring to the relational schema 6' of such contents as are shown in FIGS. 9 and 10, and generates a DML object 8' designating this determined access route. Here, DML is the data manipulation language for the network type data base 10.

Then the DML object executing means 3 specifies the DML object 8' by an executional instruction 9 which has been entered, and the network type data base 10 is accessed by the access route stated in this specified DML object 8'. Incidentally, the executional instruction 9 may be in COBOL or a similar language.

The system according to the prior art uses such a configuration to make a network type data accessible by SQL, a language for relational data bases, and especially, the table definitions of the relational schema are enabled to reflect the parent-descendant relationship based on the concept of "set" in network data bases, and the access designated in SQL is enabled to be achieved in a set-to-set tracing process, by setting in additional columns of table definitions of the relational schema 6' key items in the ancestor record obtained by tracing, in the direction toward the owner, sets linked to record definitions corresponding to those table definitions.

In this conventional system, it is possible to add items which are retrieval keys to the ancestor record as columns of the table generated from a given record. Therefore, if the parent record has a retrieval key, it is possible to designate in an SQL statement to link a table generated from the parent record with a table generated from a descendant record in a column deriving from the retrieval key of the parent record and, moreover, if that retrieval key is a unique key, the set can be uniquely identified, with the result that the network type data base can be accessed by utilizing the set.

This prior art system, however, cannot designate a table link in an SQL statement and accordingly is unable to access a network type data base by utilizing sets if the parent record does not have a retrieval key.

For instance, in the relational schema 6' shown in FIG. 10, there is a column of "department name" but none of "section name" in the employee record table 603' and the duty record 604', and no SQL statement requesting the following table links, for instance, can be expressed.

SELECT name of duty

FROM employee record table, duty record table

WHERE employee record table, department name=duty record table, department name

AND employee record table, section name=duty record table, section name

AND employee name='Inoue'

An object of the present invention is to make it possible, where a network type data base is to be accessed by SQL which is a language for relational data bases, for table links to be designated in SQL statements for tables generated from parent-descendant records even if no retrieval key, which is unique in the data base, to the parent record in the network type data base exists, and to make the processing of those table links accessible via sets.

SUMMARY OF THE INVENTION

A relational access system for network type data bases according to a first aspect of the invention has the following configuration.

Schema deriving means, into which a schema, or a subschema, of a network type data base is entered, actuates table definition generating means and unique declaration means to generate a relational schema.

Said table definition generating means, into which said schema or said subschema is entered, generates a table definition in said relational schema.

This table definition is generated correspondingly to each record definition in said entered schema or subschema, has basic items of each record definition of said schema or said subschema as basic columns, and further has key items among the basic items of the record definition of an ancestor record, which can be obtained by tracing set definitions from each record definition in the direction toward the parent, as additional columns.

Said unique declaration means, into which a unique declarative statement is entered, supplies said relational schema with the contents of this entered unique declarative statement as unique definition information, and at the same time adds the item definitions of items contained in this unique definition information to said table definition, generated from the record which is the object record of said declration and record definitions having said declaration object record as ancestor record, as columns.

This unique declarative statement, using any record definition of said schema or subschema as object record of declaration, accomplishes designation so that determination of the realization value combination of one or more items of this object record of declaration and one or more items of the ancestor record of this object record of declaration make unique the record realization value of this object record of declaration in said network type data base.

SQL statement translating means, into which said relational schema generated by said schema deriving means and an SQL statement are entered, actuates access routing means which determines the access route to realize the access requested by this SQL statement, and generates a DML object.

DML object executing means accesses said network type data base by following the access route stated in said DML object generated by said SQL translating means.

A relational access system for network type data bases according to a second aspect of the invention has the following configuration in the relational access system for network type data bases according to the first aspect of the invention.

Said SQL statement translating means, into which said relational schema generated by said schema deriving means and an SQL statement are entered, actuates unique condition extracting means and said access routing means, and generates a DML object.

Said unique condition extracting means, if the entered SQL statement requests table combination, checks the condition to combine tables, and extracts from said relational schema unique definition information having as its constituent items the items corresponding to the columns linked by an equality sign condition.

Said access routing means determines the access route to realize the access requested by this entered SQL statement and, if unique condition extracting means extracts definition information satisfying the condition, determines the access route so as to trace sets to find out the declaration object record of the extracted unique definition information.

A relational access system for network type data bases according to a third aspect of the invention has the following configuration in the relational access system for network type data bases according to the second aspect of the invention.

Said unique condition extracting means, if the entered SQL statement requests table storage, extracts from said relational schema said unique definition information having as said declaration object record the parent record of the record corresponding to the table.

Said access routing means, using a value designated by the SQL statement, searches said declaration object record for items constituting said unique definition information extracted by said unique condition extracting means, and determines the access route to store the record corresponding to the table so that this declaration object record be the parent record.

A relational access system for network type data bases according to a fourth aspect of the invention has the following configuration in the relational access system for network type data bases according to the second aspect of the invention.

Said unique condition extracting means, if the entered SQL statement requests updating of values in a column, extracts from said relational schema said unique definition information in which the record corresponding to the table is said declaration object record and the items corresponding to the column whose values are to be updated are the items constituting the unique definition information.

Said access routing means, using the updated values of the items constituting said unique definition information extracted by said unique condition extracting means, searches said declaration object record, and determines the access route to re-link the sets of records corresponding to the table so that this declaration object record become the new parent record.

BRIEF DESCRIPTION OF THE DRAWINGS

The above-mentioned and other objects, features and advantages of the present invention will become more apparent from the following detailed description when taken in conjunction with the accompanying drawings, wherein.

In the drawings, the same reference numerals denote respectively the same constituent elements.

DETAILED DESCRIPTION OF THE PREFERRED EMBODIMENT

Figure 1:
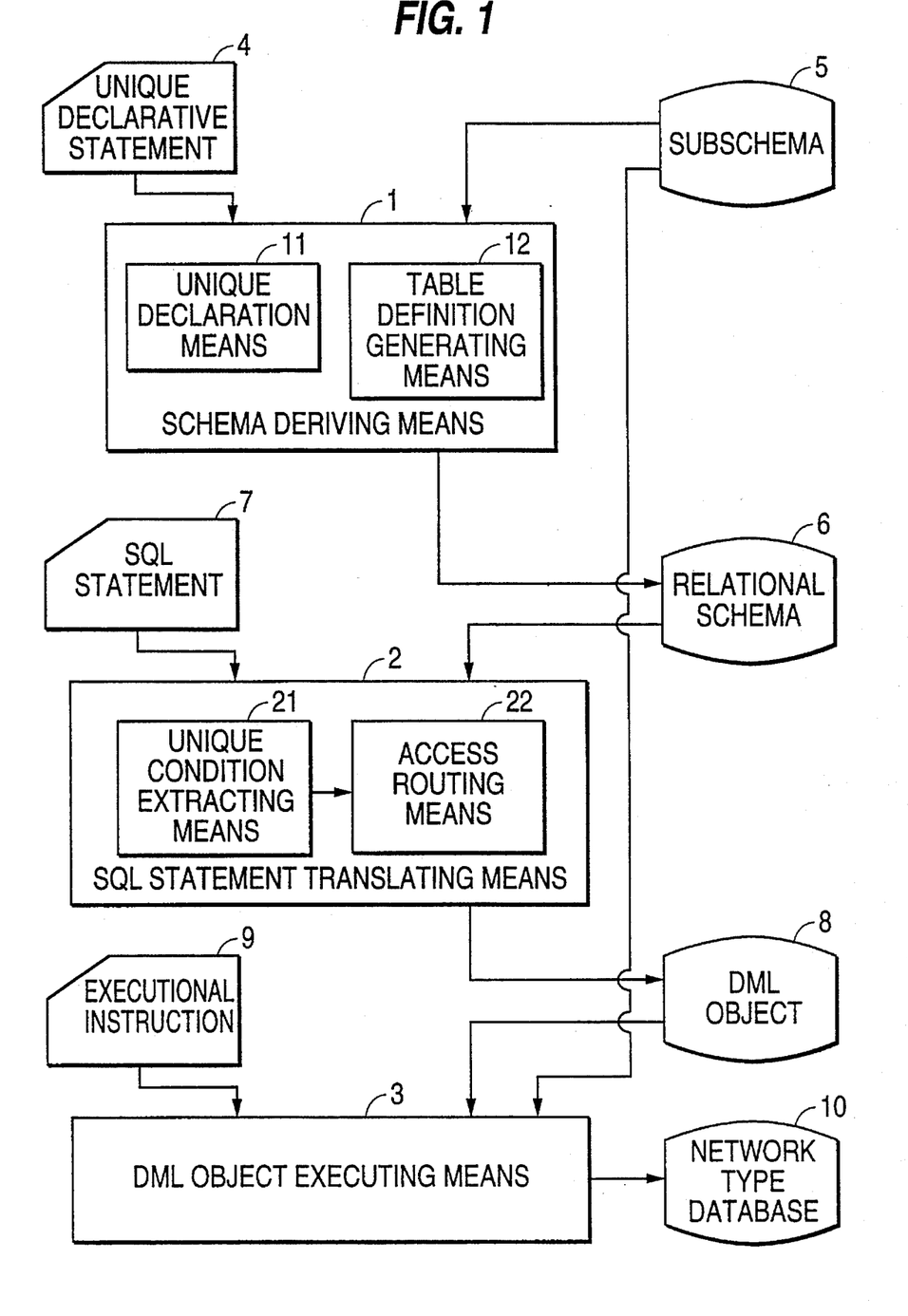
FIG. 1 is a diagram illustration the configuration of a preferred embodiment of the invention.

Referring to FIG. 1, a relational access system for network type data bases, which is a preferred embodiment of the present invention, includes schema deriving means 1, into which a unique declarative statement 4 and a subschema 5 are entered, for supplying a relational schema 6; an SQL statement translating means 2, into which the relational schema 6 and an SQL statement 7 are entered, for supplying a DML object 8; and DML object executing means 3, into which the DML object 8 and an executional instruction 9 are entered, for accessing a network type data base 10.

The subschema 5 results from the extraction, from a schema (not shown) in which information on the overall logical structure of the network type data base 10 is to be stored, of the logical structure of the part required for individual processing programs, and includes record definitions indicating the structures of records stored in the network type data base 10, set definitions representing relationships between the records, and the definitions of key items, which serve as keys in directly accessing the records.

The unique declarative statement 4, using any record definition of the subschema 5 as an object record of declaration, has to accomplish a designation so that determination of the realization value combination of one or more items of this object record of declaration and one or more items of the ancestor record of this object record of declaration make unique the record realization value of this object record of declaration in the network type data base 10.

The schema deriving means 1 is means, into which the unique declarative statement 4 and the subschema 5 are entered, for supplying the relational schema 6, and includes unique declaration means 11 and table definition generating means 12.

The table definition generating means 12 is identical with the table definition generating means 12 in the schema deriving means 1' according to the prior art shown in FIG. 8, and supplies correspondence information while outputting, in accordance with a prescribed conversion rule, record definitions in the subschema 5 as table definitions of the relational schema 6.

The unique declaration means 11, into which the unique declarative statement 4 is entered, supplies its contents to the relational schema 6 as unique definition information. The unique declaration means 11 further adds the definitions of items contained in this unique definition information as additional columns to a table definition generated from the definitions of the object record of declaration and of records having this object record of declaration as their ancestor record.

The SQL statement translating means 2, into which the relational schema 6 and the SQL statement 7 are entered, is means for supplying the DML object 8, and includes unique condition extracting means 21 and access routing means 22.

The unique condition extracting means 21 is means to extract, if unique definition information fitting the contents of the SQL statement 7, that unique definition information.

The access routing means 22 is means to determine the access route for realizing the access requested by the inputted SQL statement and, unlike the access routing means 22' according to the prior art shown in FIG. 8, determines the access route taking account of the unique definition information extracted by the unique condition extracting means 21.

The DML object executing means 3, which is identical with the DML object executing means 3 according to the prior art shown in FIG. 9, specifies the DML object 8 by the executional instruction 9, and accesses the network type data base 10 following the access route stated in that DML object 8.

Now will be described the operation of this preferred embodiment of the invention having the above-described configuration.

In this embodiment, which is a relational access system for network type data bases, first the schema deriving means 1 actuated, then is the SQL statement translating means 2 is actuated, and finally the DML object executing means 3 is actuated.

Figure 2:
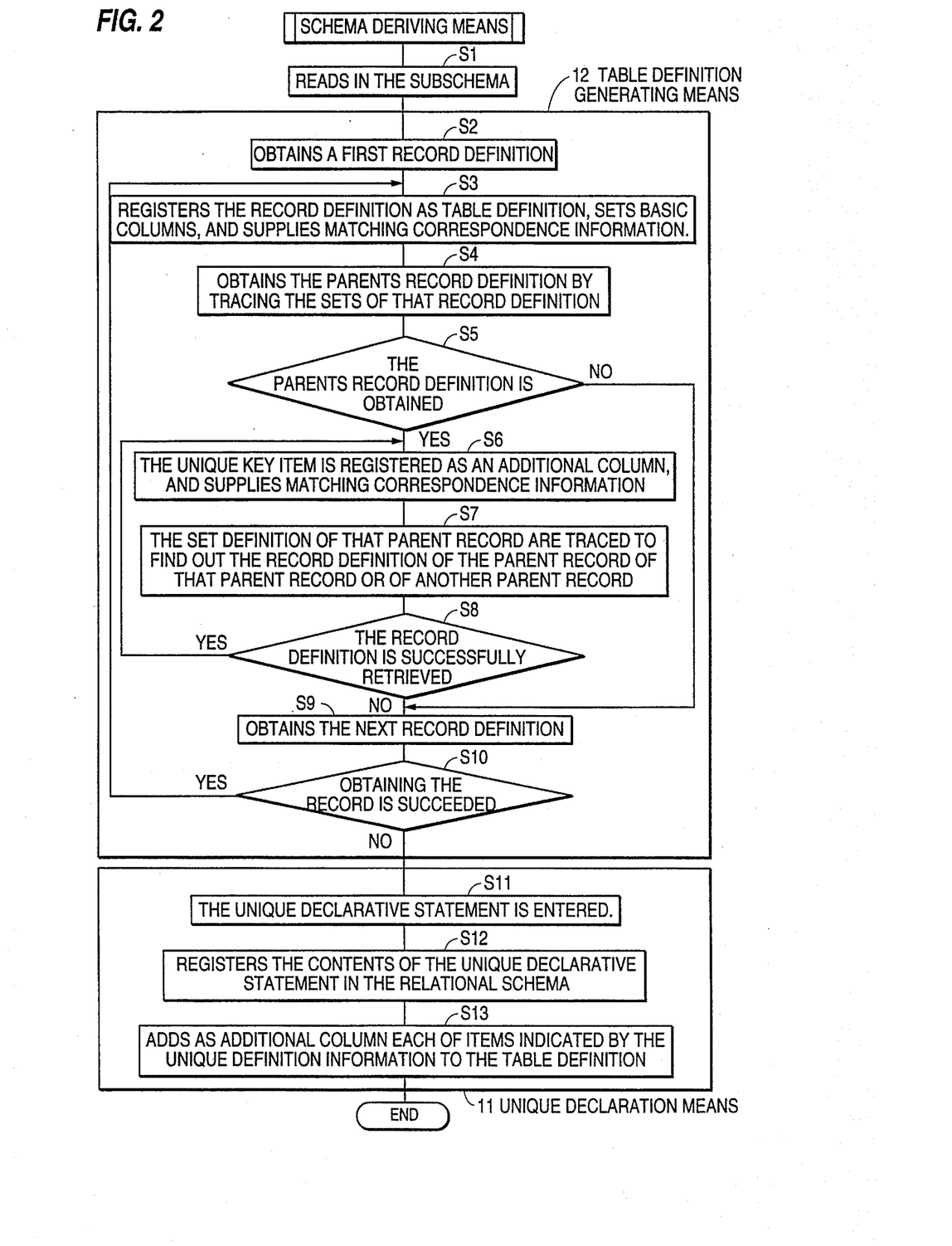
FIG. 2 is a flow chart showing the processing by the schema deriving means.

When actuated, the schema deriving means 1 starts the processing shown in FIG. 2.

First, the schema deriving means 1 reads in the subschema 5 (S1), and executes the steps of processing from S2 through S10 with the table definition generating means 12.

The table definition generating means 12 first obtains a first record definition (S2) from the subschema 5 which was read in, registers that record definition in the relational schema 6 as a table definition, at the same time sets all the items in that record definition as basic columns, and supplies matching correspondence information (S3). Then, it obtains the parent record definition by tracing the sets of that record definition (S4); if it fails to retrieve the parent record on account of the absence of sets (NO at S5), obtains the next record definition from the subschema 5 (S9); if it succeeds in obtaining a record (YES at S10), returns to step S3, and repeats the aforementioned steps of processing.

If the parent record definition of the pertinent record definition is obtained at step S4 (YES at S5), the unique key item of that record definition is registered as an additional column of the table definition at this time, and so is matching correspondence information, in the relational schema 6 (S6). Furthermore, the record definition and set definition of that parent record are traced to find out the record definition of the parent record of that parent record or of another parent record (S7); if it is successfully retrieved (YES at S8), the processing returns to S6 to repeat the aforementioned steps or, if the retrieval is unsuccessful, the processing will move on to step S9.

In the event of failure to retrieve the next record definition at step S9 (NO at S10), i.e. when all the record definitions in the subschema 5 have been processed, the control is handed over to the unique declaration means 11.

The unique declaration means 11, into which the unique declarative statement 4 is entered (S11), registers the contents of the unique declarative statement 4 in the relational schema 6 as unique definition information (S12). It further adds as additional column each of the items indicated by the unique definition information to the table definition derived from the object record of declaration indicated by the unique definition information and to the table definition derived from the record definition having the object record of declaration as an ancestor record (S13). The processing of unique declaration is thereby completed.

The operations of the schema deriving means 1 can be described as follows with reference to a specific example shown in FIG. 6. Incidentally, the subschema 5 of FIG. 6 is identical with the subschema 5 shown in FIG. 10.

Figure 6:
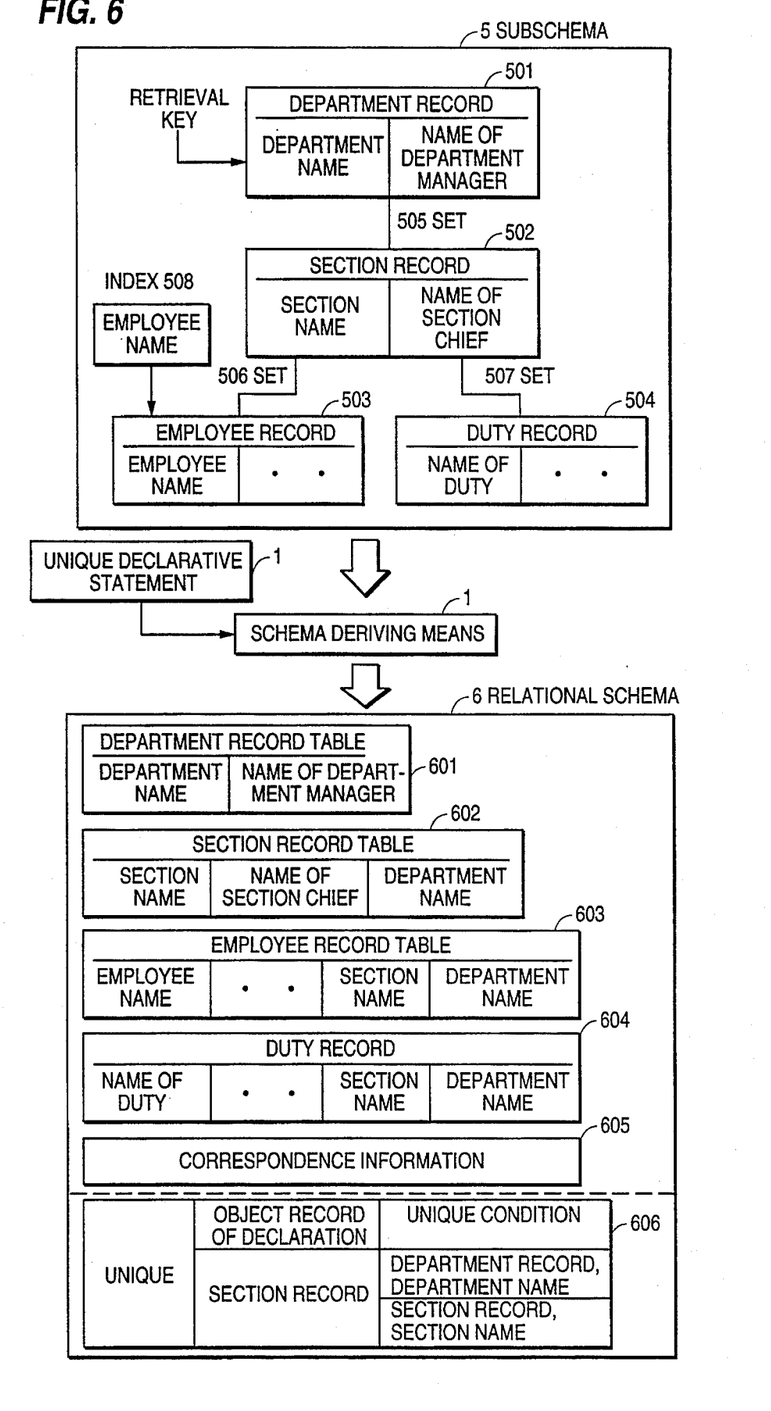
FIG. 6 is a diagram illustrating an example of subschema and an example of relational schema generated by the schema deriving means from this subschema and a unique declarative statement.

When actuated, the schema deriving means 1 reads in the subschema 5 of FIG. 6 (S1), and actuates the table definition generating means 12.

The table definition generating means 12 obtains a department record 501 from the subschema 5 as the first record definition (S2); registers that department record 501 as a department record table 601 as shown in the relational schema 6 of FIG. 6; at the same time registers all the items ("department name" and "name of department manager") in the department record table 601 as basic columns; and registers in correspondence information 605 that the department record table 601 corresponds to the department record 501 (S3). Then it traces the set of the department record 501 to search for the parent record, but, since the department record 501 has no set in the direction toward the owner, the steps of processing pertaining to the department record 501 is completed (NO at S5).

Then, the table definition generating means 12 obtains a section record 502 as the second record definition (S9); registers the section record 502 as a section record table 602 in the relational schema 6; at the same time registers all the items ("section name" and "name of section chief") in the section record table 602 as basic columns; and registers in correspondence information 605 that the section record table 602 corresponds to the section record 502 (S3). Then it traces the set of the section record 502 to search for the department record 501 which is its parent record (YES at S4 and S5); registers the unique key item "department name" in the department record 501 in the section record table 602 as an additional column; and registers in correspondence information 605 that this additional column "department name" is the item "department name" of the department record 501 obtained by tracing the set 505 (S6). The table definition generating means 12 further searches for the parent record or any brother record of the department record 501, but, as no such record exists in the subschema 5 of FIG. 6, it completes the steps of processing pertaining to the section record 502 (NO at S8).

Then, the table definition generating means 12 obtains an employee record 503 as the third record definition (S9); registers the employee record 503 as an employee record table 603 in the relational schema 6; at the same time registers all the items ("employee name" . . . ) in the employee record table 603 as basic columns; and registers in correspondence information 605 that the employee record table 603 corresponds to the employee record 503 (S3). Then it traces the set of the employee record 503 to search for the section record 502 which is its parent record (YES at S4 and S5), but, since the section record 502 has no item which can serve as the unique retrieval key, it moves on to step S7 of processing without processing anything at step S6. At step S7, the table definition generating means 12 further obtains the department record 501, which is the parent record of the section record 502 (YES at S8); registers the "department name" which is the unique key item of the department record 501 in the employee record table 603 as an additional column; and registers in correspondence information 605 that this additional column "department name" is the item "department name" of the department record 501 obtained by tracing the set 506, section record 502 and set 505 (S6). It further searches for the parent record or any brother record of the department record 501, but, as no such record exists in the subschema 5 of FIG. 6, it completes the steps of processing pertaining to the employee record 503 (NO at S8).

Next, the table definition generating means 12 obtains a duty record 504 as the fourth record definition (S9), and performs the same processing as for the employee record 503. It thereby registers a duty record table 604 corresponding to the duty record 504 in the relational schema 6; at the same time registers all the items ("name of duty" . . . ) of the employee record table 603 as the basic columns of the table and the unique key item "department name" of the department record 501, which is the ancestor record of the duty record table 504, as an additional column; and registers in correspondence information 605 that the duty record table 604 corresponds to the duty record 504 and that its additional column "department name" is the item "department name" of the department record 501 obtained by tracing the set 507, section record 502 and set 505.

Then, the table definition generating means 12 seeks for the fifth record definition, but, since no fifth record definition exists in the subschema 6 of FIG. 6, it completes the processing for table generation, with the control handed over to the unique declaration means 11.

Incidentally, by this point of time, only the "department name" has been added as additional columns of the employee record table 603 and of the duty record table 604.

The unique declaration means 11, taking over the control from the table definition generating means 12, enters the unique declarative statement 4 (S11).

In the subschema 5 of FIG. 6, the user declares in the unique declarative statement 4 that the section record 502 will be used as the object record of unique declaration and that the combination of its item "section name" and the item "department name" of the department record 501, which is the parent record of the section record 502, is unique in the network type data base 10.

The unique declaration means 11 registers the contents declared in the unique declarative statement 4 in the relational schema 6 as shown in FIG. 6 as unique definition information 606 (S12). By so combining the "department name" and the "section name" for the SQL statement translating means 2, it is made recognizable that the section record 502 is unique in the network type data base 10.

Next, the unique declaration means 11 registers as columns the items ("department name" and the "section name") indicated by the unique definition information in the section record table 602 derived from the section record 502, which is the object record of declaration; the employee record 503 whose ancestor record is the section record 502; the employee record table 603 derived from the duty record 504; and the duty record table 604 (S13). In the case of FIG. 6, since the "department name" and the "section name" are already registered in the section record 602, no new column is added to the section record table 602. On the other hand, since there is the "department name" but not the "section name" in the employee record table 603 and the duty record table 604, columns of the "section name" are added to the employee record table 603 and the duty record table 604.

In the manner described above, the relational schema 6 illustrated in FIG. 6 is generated from the subschema 5 shown in the same diagram.

Next will be described the operations of the SQL statement translating means 2.

Figure 3:
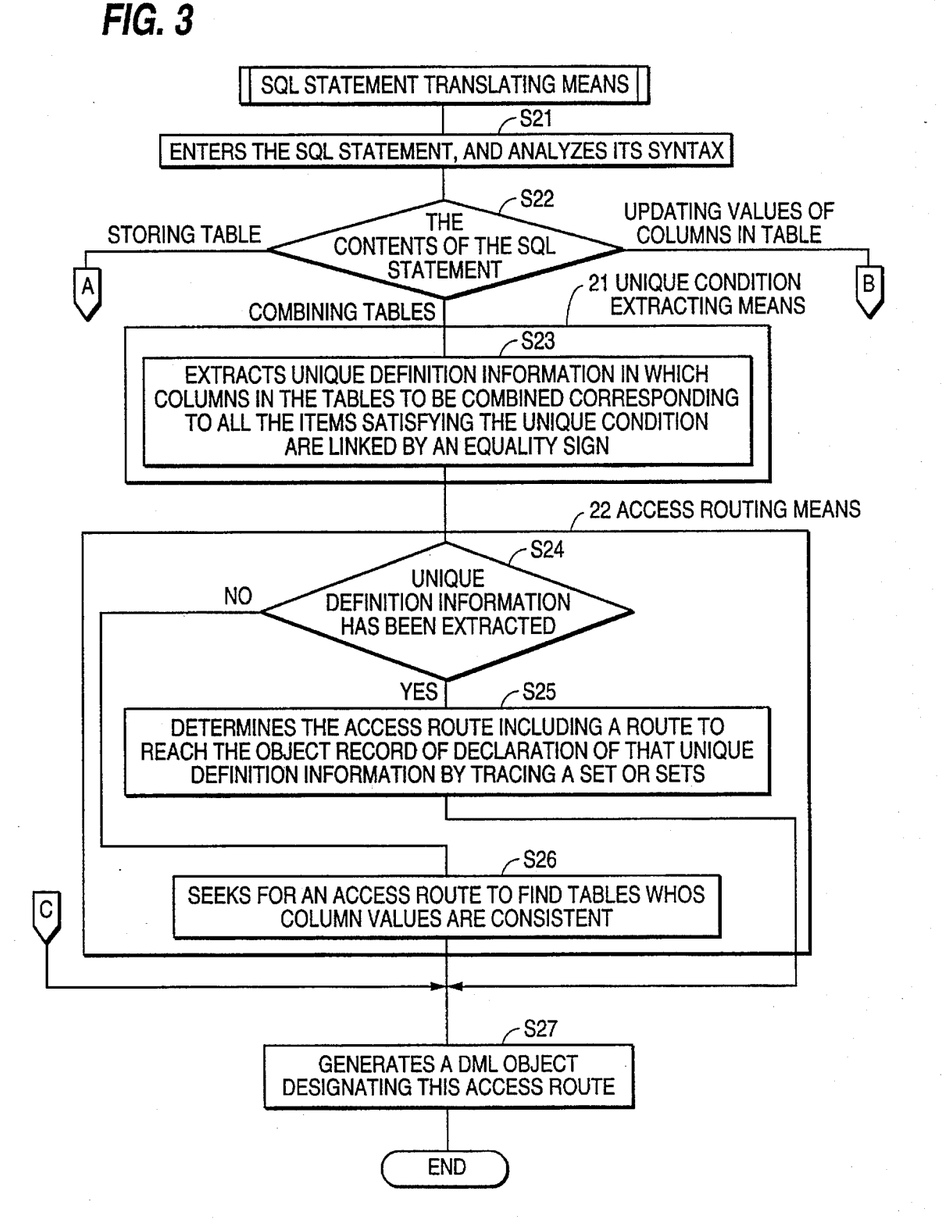
FIG. 3 is a flow chart showing a part of the processing by the SQL statement translating means.
Figure 4:
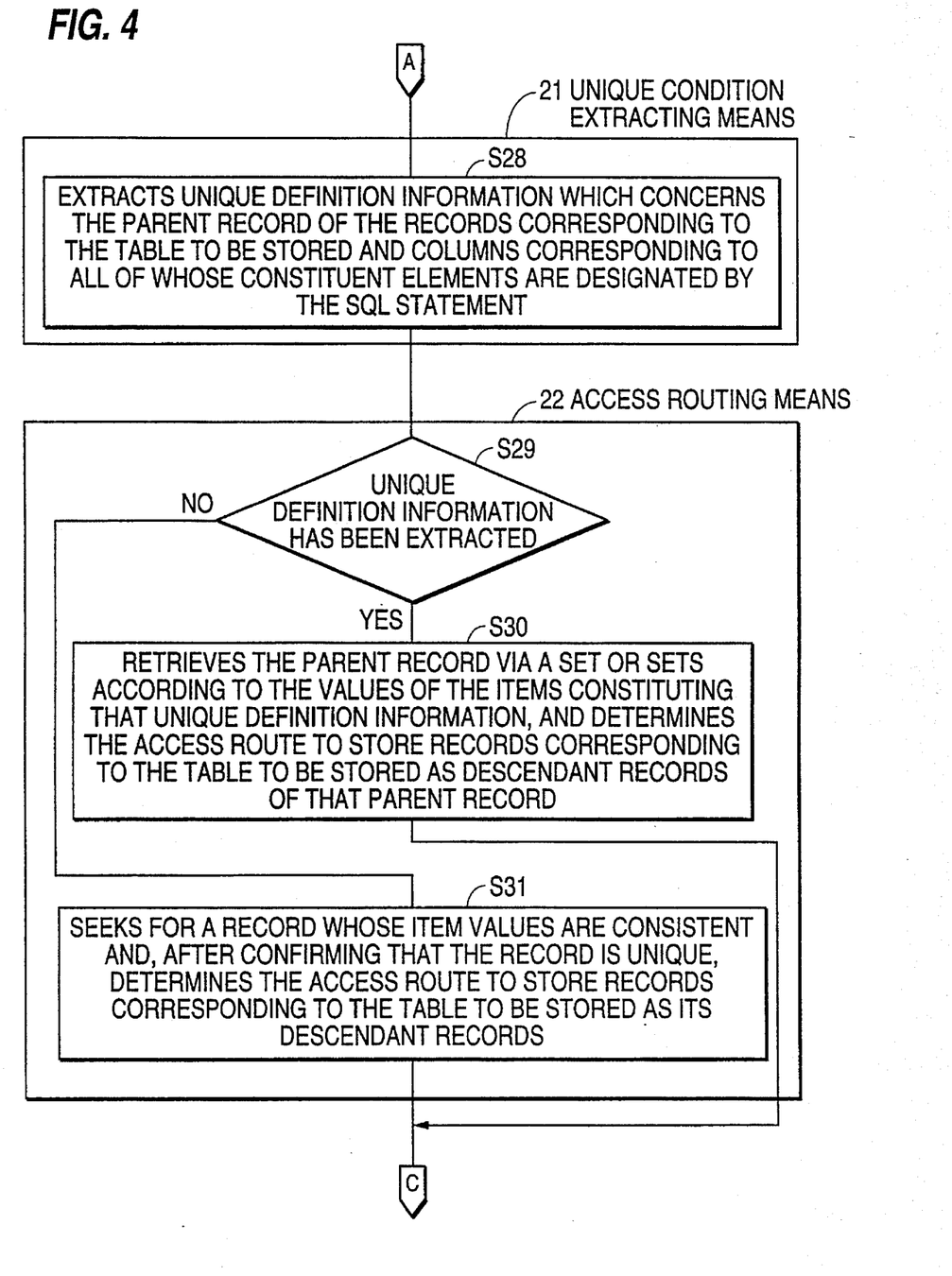
FIG. 4 is a flow chart showing the following part of the processing by the SQL statement translating means.
Figure 5:
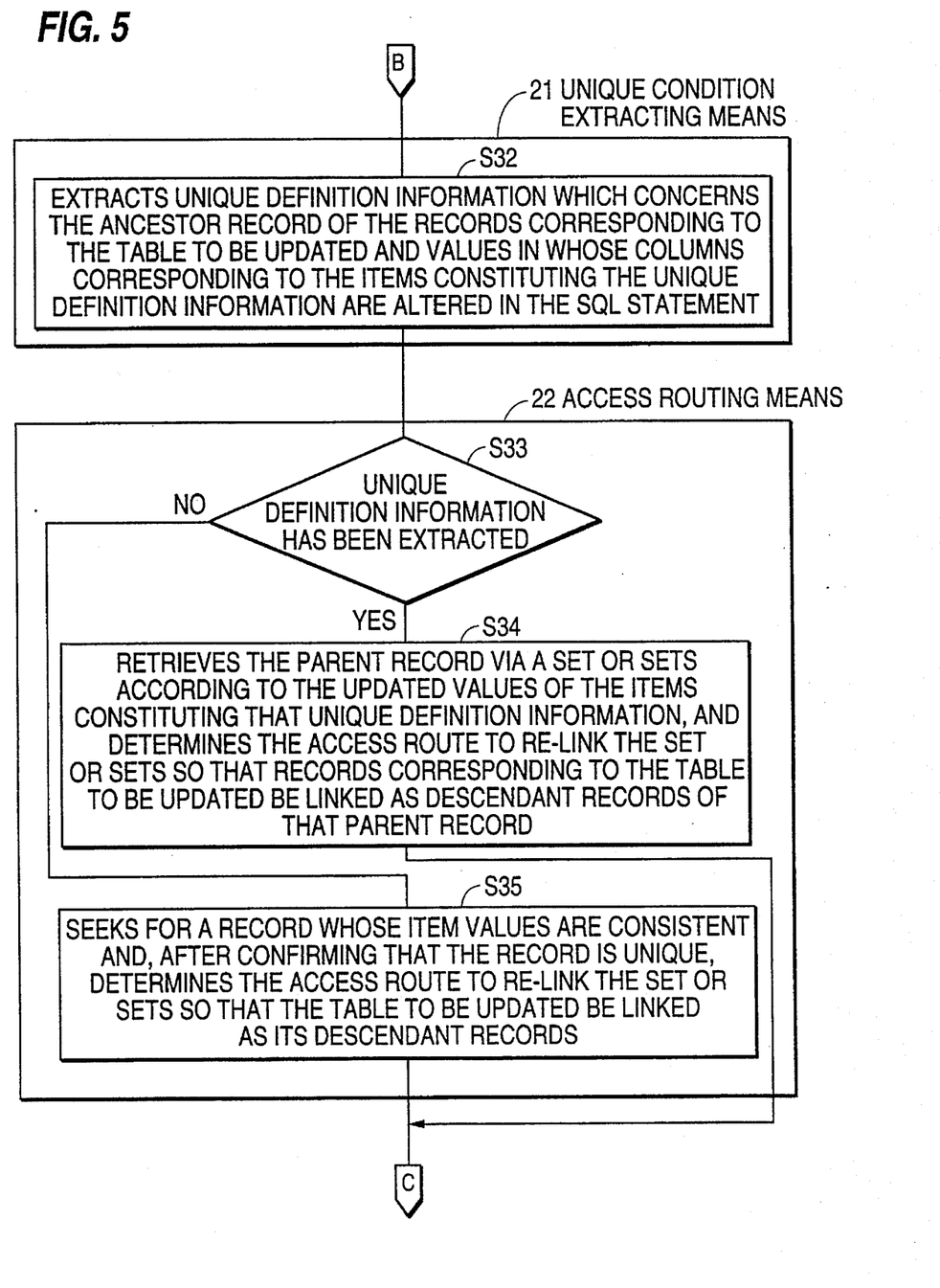
FIG. 5 is a flow chart showing the rest of the processing by the SQL statement translating means.

When actuated, the SQL statement translating means 2 executes the steps of processing shown in FIGS. 3, 4 and 5. First, the SQL statement 7 is entered into the SQL statement translating means 2, which analyzes its syntax (S21 in FIG. 3), followed by branching according to the contents of the SQL statement 7 revealed by the syntax analysis (S22) to perform processing in one or another of the following manners.

In Case of Combining Tables:

If the SQL statement 7 calls for a combination of tables, the unique condition extracting means 21 checks the SQL statement 7 for the table combining condition, and extracts from the relational schema 6 unique definition information whose constituent elements correspond to columns linked by an equality sign in the identified condition, in other words unique definition information in which columns in the tables to be combined corresponding to all the items satisfying the unique condition are linked by an equality sign (S23). The result is notified to the access routing means 22.

The access routing means 22 checks whether or not unique definition information satisfying the condition has been extracted by the unique condition extracting means 21 (S24) and, if unique definition information satisfying the condition has been extracted, determines the access route including a route to reach the object record of declaration of that unique definition information by tracing a set or sets, i.e. the access route, to determine the tables to be combined at the time the object record of declaration has been retrieved by the set or sets (S25).

On the other hand, if no unique definition information satisfying the condition has been extracted, the access routing means 22 again seeks for an access route to find tables whose column values are consistent, i.e. once finds the values of items corresponding to the columns of the condition of table combination, and determines the access route again to retrieve a record having items whose values are consistent (S26).

Therefore if, for example, an SQL statement 7 of the following table combination (since, unlike in the example of the prior art, the "section name" column is defined in the employee record table 603 and the duty record table 604 of the relational schema 6, table combination designation in such an SQL statement is possible) is issued to the relational schema 6 shown in FIG. 6, first the unique condition extracting means 21 checks the condition to combine the tables.

SELECT name of duty

FROM employee record table, duty record table

WHERE employee record table, department name=duty record table, department name

AND employee record table, section name=duty record table, section name

AND employee name='Inoue'

The condition to combine the tables in this example is:

Employee record table, department name=duty record table, department name

AND employee record table, section name=duty record table, section name

It is known by referring to the unique definition information 606 that this condition means that columns in the tables to be combined (the employee record table 603 and the duty record table 604) corresponding to the "department name" and the "section name", which are the whole items constituting the unique definition information 606, are linked to each other by an equality sign.

If such unique definition information 606 has been extracted, the access routing means 22 can recognize that the section record 502, employee record 503 and duty record 504 are records of the same set occurrence, accordingly judges that they can be accessed by tracing sets, and determines the access route including a route to reach the section record 502, with the object record of declaration of the unique definition information. Because of the presence of the condition of Employee name='Inoue' in this case, ultimately "an access route to find out the name of duty is determined by retrieving an employee record 503 having the value of 'Inoue' by using an index 508, seeking for the section record 502 by tracing the set 506 and seeking for the duty record 504 by tracing the set 507".

In the absence of unique definition information 606 in the relational schema 6 of FIG. 6, the access routing means 22 determines the access route by step S26 of processing in FIG. 3. For instance, "first an employee record 503 whose employee name is 'Inoue' is accessed by using the index 508; the section name and department name are found out from the section record 502 and department record 501 by tracing the sets 506 and 505; then all the department records having the identical department name are sought; the section records having the same section name are sought by tracing the set 505 from each department record; and further the name of duty is sought by finding out the duty record 504 by tracing the set 507."

In Case of Storing Table:

If the SQL statement 7 calls for storage of a table, the unique condition extracting means 21 extracts unique definition information which concerns the parent record of the records corresponding to the table to be stored and columns corresponding to all of whose constituent elements are designated by the SQL statement (S28 of FIG. 4), and notifies the result to the access routing means 22.

The access routing means 22, if unique definition information satisfying the condition has been extracted (YES at S29), retrieves the parent record via a set or sets according to the values of the items constituting that unique definition information, and determines the access route to store records corresponding to the table to be stored as descendant records of that parent record (S30).

On the other hand, if no unique definition information satisfying the condition has been extracted (NO at S29), the access routing means 22 again seeks for a record whose item values are consistent and, after confirming that the record is unique, determines the access route to store records corresponding to the table to be stored as its descendant records (S31).

Therefore if, for example, an SQL statement 7 of the following table storage is issued to the relational schema 6 of FIG. 6:

INSERT INTO employee record table (department name, section name, employee name, . . . )

VALUES ('planning department', 'planning section', 'Saijo', . . . )

the unique condition extracting means 21 searches for the unique definition information of the section record 502, which is the parent record of the employee record 503 corresponding to the employee record table 603; as the unique definition information 606 is discovered in this case, checks whether or not the column values corresponding to the "department name" and "section name" constituting the unique definition information 606 are designated in the SQL statement 7; finds that the 'planning department' and the 'planning section' are designated; extracts the unique definition information 606 as unique definition information satisfying the condition; and notifies it to the access routing means 22 (S28).

The access routing means 22 searches the department record 501 according to the department name "planning department" constituting the unique definition information extracted by the unique condition extracting means 21, then searches the section record 502 by using a set according to the section name "planning section", and determines the access route to store the employee record corresponding to the table to be stored this time as a descendant record of that section record 502.

In Case of Updating Values of Columns in Table:

If the SQL statement calls for updating of values in the additional columns of a table, the unique condition extracting means 21 extracts unique definition information which concerns the ancestor record of the records corresponding to the table to be updated and values in whose columns corresponding to the items constituting the unique definition information are altered in the SQL statement (S32 of FIG. 5), and notifies the results to the access routing means 22. If the SQL statement requires updating of values in the basic columns of the table, the processing is accomplished in the same manner as according to the prior art.

The access routing means 22, if unique definition information satisfying the condition has been extracted (YES at S33), retrieves the parent record via a set or sets according to the updated values of the items constituting that unique definition information, and determines the access route to re-link the set or sets so that records corresponding to the table to be updated be linked as descendant records of that parent record (S34).

On the other hand, if no unique definition information satisfying the condition has been extracted (NO at S33), the access routing means 22 seeks for a record whose item values are consistent and, after confirming that the record is unique, determines the access route to re-link the set or sets so that the table to be updated be linked as its descendant records (S35).

Therefore if, for example, an SQL statement 7 to update values in the columns the following table is issued to the relational schema 6 of FIG. 6:

UPDATE employee record table

SET section name='public relations section'

WHERE department name='planning department'

AND section name='planning section'

AND employee name='Takeda' the unique condition extracting means 21 searches for the unique definition information concerning the ancestor record of the employee record 503 corresponding to the employee record table 603; as the unique definition information 606 is discovered in this case, checks whether or not the column values corresponding to the "department name" and "section name" constituting the unique definition information 606 are updated in the SQL statement 7; finds that the section name is updated; extracts the unique definition information 606 as unique definition information satisfying the condition; and notifies it to the access routing means 22 (S32).

The access routing means 22 searches the section record 502 according to the department name "planning department", which is not an object of updating, and the "public relations section", which is an updated value of the section name, among the items constituting the unique definition information, and determines the access route to re-link the set so that the records corresponding to the table to be updated be linked as descendant records of that section record 502.

Now, upon completion of one or another of the processing sequences according to the contents of the SQL statement, the SQL statement translating means 2 generates and outputs a DML object 8 equivalent to the SQL statement 7 along the determined access route (S27 of FIG. 8), and thereby completes the processing to translate the SQL statement.

Next will be described the operations of the DML object executing means 3.

Figure 7:
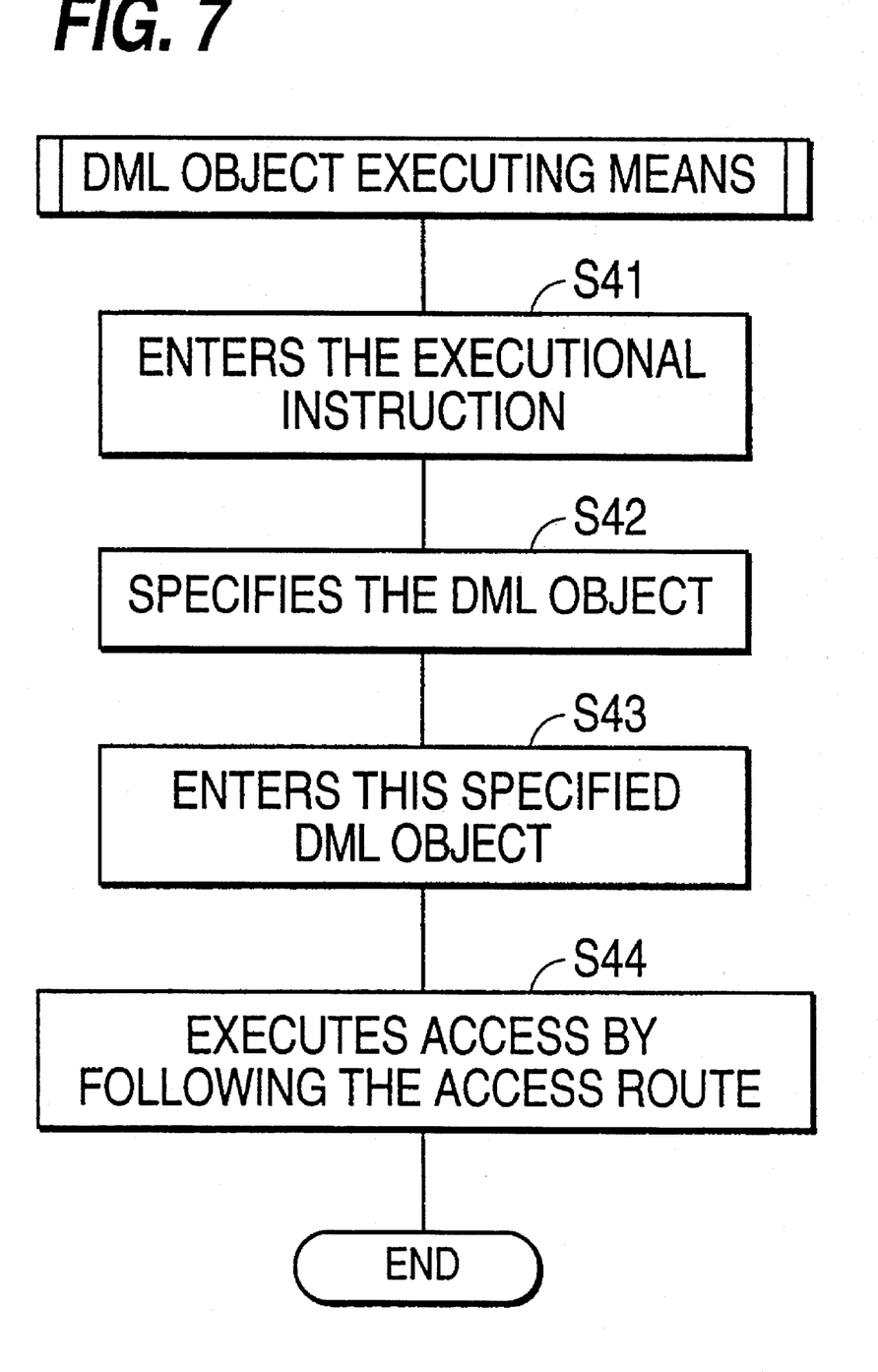
FIG. 7 is a flow chart showing the processing by the DML object executing means.

When actuated, the DML object executing means 3 starts the processing shown in FIG. 7. First, the executional instruction 9 is entered into the DML object executing means 3 (S41), which specifies the DML object 8 on the basis of this entered executional instruction 9 (S42). Next, this specified DML object 8 is entered (S43), and the DML object executing means 8 executes access to the network type data base 10 by following the access route stated in that DML object 8 (S44). The SQL statement 7 is thereby executed. Incidentally, in accessing the network type data base 10, the DML object executing means 3 refers to the subschema 5 and the schema (not shown) of the network type data base 10.

As hitherto described, the feature of the present invention consists in that when the unique declaration means 11, using any record definition of the schema or subschema 5 as an object record of declaration, first determines the combination of one or more items of this object record of declaration and one or more items of the ancestor record of this object record of declaration, it enters a unique declarative statement 4 so designated as to make unique this object record of declaration in the network type data base 10, supplies the contents of this unique declarative statement 4 to the relational schema 6 as unique definition information, and adds the definitions of items contained in this unique definition information as columns to the table definition generated from the definitions of the object record of declaration and of records having this object record of declaration as its ancestor record; then the relational schema 6 and the SQL statement 7 are entered into the SQL statement translating means 2; if this SQL statement 7 requests table combination, the unique condition extracting means 21 checks the condition of table combination, extracts from the relational schema 6 unique definition information consisting of items corresponding to columns linked by an equality sign under that condition; the access routing means 22 determines the access so as to reach the object record of declaration of the extracted unique definition information by tracing a set or sets, and generates a DML object 8 designating this access route; and the DML object executing means 3 then accesses the network data base 10 by following the access route stated in this DML object 8.

By virtue of this feature, the invention has the advantage that, when a network type data base is to be accessed by SQL, which is a language for relational data bases, combination of tables, if they are generated from parent-descendant records, can be designated even if the parent record in the network type data base has no retrieval key which is unique in the data base, and furthermore those tables can be accessed at high speed by utilizing sets.

What is claimed is:

1. A relational access system for network type data bases, comprising:

schema deriving means, into which a schema, or a subschema, of a network type data base is entered, for actuating table definition generating means and unique declaration means to generate a relational schema;

wherein said table definition generating means, into which said schema or said subschema is entered, generates a table definition in said relational schema;

wherein said table definition is generated correspondingly to each record definition in said entered schema or subschema, has basic items of each record definition of said schema or said subschema as basic columns, and further has key items among the basic items of the record definition of an ancestor record, which can be obtained by tracing set definitions from each record definition in a direction toward the ancestor record, as additional columns;

wherein said unique declaration means, into which a unique declarative statement is entered, supplies said relational schema with contents of the entered unique declarative statement as unique definition information, and at a same time adds item definitions of items contained in the unique definition information to said table definition, generated from a record which is an object record of declaration and record definitions having said object record of declaration as an ancestor record, as columns;

and wherein said unique declarative statement, using any record definition of said schema or subschema as said object record of declaration, accomplishes a designation so that a determination of a record realization value combination of one or more items of said object record of declaration and one or more items of the ancestor record of said object record of declaration make unique the record realization value of said object record of declaration in said network type data base;

SQL (structured query language) statement translating means, into which said relational schema generated by said schema deriving means and an SQL statement are entered, for actuating access routing means which determines an access route to realize an access requested by the SQL statement, and for generating a DML (data manipulation language) object which includes the access route; and DML object executing means for accessing said network type data base by following the access route included in the DML object generated by said SQL statement translating means.

2. A relational access system for network type data bases, as claimed in claim 1, wherein:

said SQL statement translating means, into which said relational schema generated by said schema deriving means and the SQL statement are entered, actuates unique condition extracting means and said access routing means, and generates the DML object;

said unique condition extracting means, if the entered SQL statement requests a table combination, checks the SOL statement for a condition to combine tables, and extracts from said relational schema unique definition information having as its constituent items all items corresponding to columns linked by an equality sign condition; and said access routing means determines the access route to realize the access requested by the entered SQL statement and, if said unique condition extracting means extracts the unique definition information that satisfies the condition, determines the access route so as to trace sets to find out the object record of declaration of the extracted definition information.

3. A relational access system for network type data bases, as claimed in claim 2, wherein:

said unique condition extracting means, if the entered SQL statement requests a table storage for a table, extracts from said relational schema said unique definition information having as said object record of declaration the parent record of the record corresponding to the table; and said access routing means, using a value designated by the entered SQL statement, searches said object record of declaration for items constituting said unique definition information extracted by said unique condition extracting means, and determines the access route to store a record corresponding to the table so that said object record of declaration becomes the new parent record.

4. A relational access system for network type data bases, as claimed in claim 2, wherein:

said unique condition extracting means, if the entered SQL statement requests an updating of values in a column of a table, extracts from said relational schema said unique definition information in which a record corresponding to the table is said object record of declaration and items corresponding to the column whose values are to be updated are the items constituting the unique definition information; and said access routing means, using the updated values of the items constituting said unique definition information extracted by said unique condition extracting means, searches said object record of declaration, and determines the access route to re-link sets of records corresponding to the table so that said object record of declaration becomes the new parent record.

5. A relational access method for a network type data base, comprising the steps of:

a) inputting a schema or subschema for the network type data base, said schema or said subschema including record definitions of each record stored in the network type data base, set definitions representing relationships among said each record and ancestor records of said each record, and definitions of key items used to directly access said each record in the network type data base;

b) creating a table definition for said each record by setting each item in the corresponding record definition of said each record as a basic column, supplying matching correspondence information to create an entry for a correspondence table, and obtaining parent record definitions by tracing sets of the corresponding record definition for each ancestor record of said each record;

c) if any of the parent record definitions are obtained in the step b), determining if said any of the parent record definitions contain unique key items;

d) if said any of the parent record definitions contain unique key items, including each unique key item as additional columns to the corresponding record definition of said each record;

e) inputting a unique declarative statement, said unique declarative statement indicating which one of said each record is to be used as an object record of unique declaration;

f) storing contents of said unique declarative statement as unique definition information, said unique definition information being used to uniquely identify said each record; and g) adding additional columns to the corresponding record definition of said each record based on said unique definition information which is not already included in the corresponding record definition, wherein a structured query language (SQL) statement designed for accessing a relational type data base can be used to access said network type data base by using the relational access method.

6. The method, as claimed in claim 5, further comprising the steps of:

h) entering the SQL statement;

i) analyzing syntax of the SQL statement to determine contents of the SQL statement;

j) if the analyzed syntax of the SQL statement is for combining one or more tables, then performing the following steps in sequence:

j1) extracting said unique definition information, if any, in which columns in the one or more tables to be combined are linked by an equality sign; and j2) using said extracted unique definition information to determine an access route through said network type data base in order to perform the combining of the one or more tables.

7. The method, as claimed in claim 5, further comprising the steps of:

h) entering the SQL statement;

i) analyzing syntax of the SQL statement to determine contents of the SQL statement;

j) if the analyzed syntax of the SQL statement is for storing data into a table, then performing the following steps in sequence:

j1) extracting said unique definition information, if any, in which said one record corresponds to a parent record of a record corresponding to said table for storing data therein; and j2) using said extracted unique definition information to determine an access route through said network type data base in order to perform the storing into the table.

8. The method, as claimed in claim 5, further comprising the steps of:

h) entering the SQL statement;

i) analyzing syntax of the SQL statement to determine contents of the SQL statement;

j) if the analyzed syntax of the SQL statement is for updating values of columns in a table, then performing the following steps in sequence:

j1) extracting said unique definition information, if any, in which said one record corresponding to said unique definition information is an ancestor record of a record corresponding to said table which is to have said values of columns updated; and j2) using said extracted unique definition information to determine an access route through said network type data base in order to perform updating of said values of columns in said table.

* * * * *